Sept. 17, 1957  V. X. MONTANARO  2,806,732
REMOVABLE HANDLES FOR RECEPTACLES
Original Filed Feb. 12, 1940  2 Sheets-Sheet 1
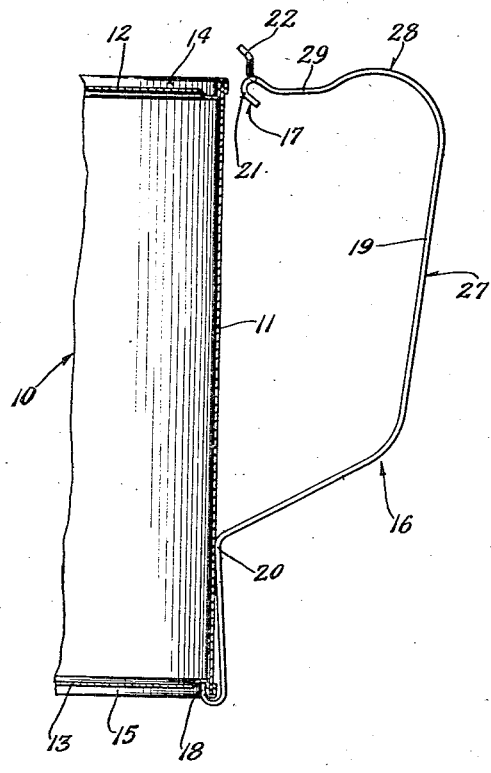
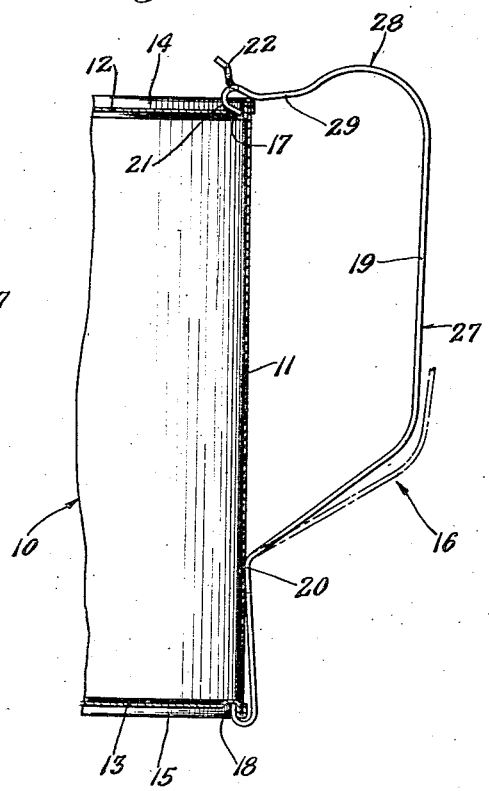
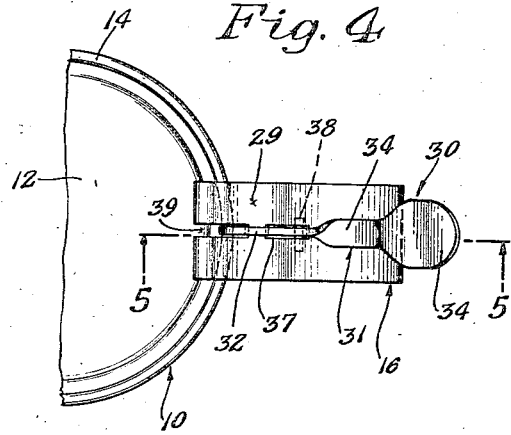
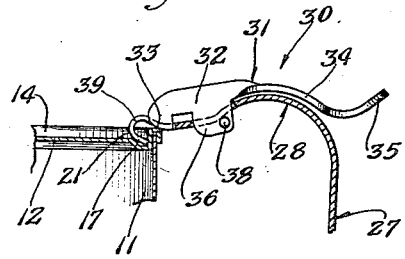
INVENTOR
Vincent X. Montanaro
BY Feyrer and Mack
ATTORNEY Sept. 17, 1957    V. X. MONTANARO    2,806,732
REMOVABLE HANDLES FOR RECEPTACLES
Original Filed Feb. 12, 1940    2 Sheets-Sheet 2
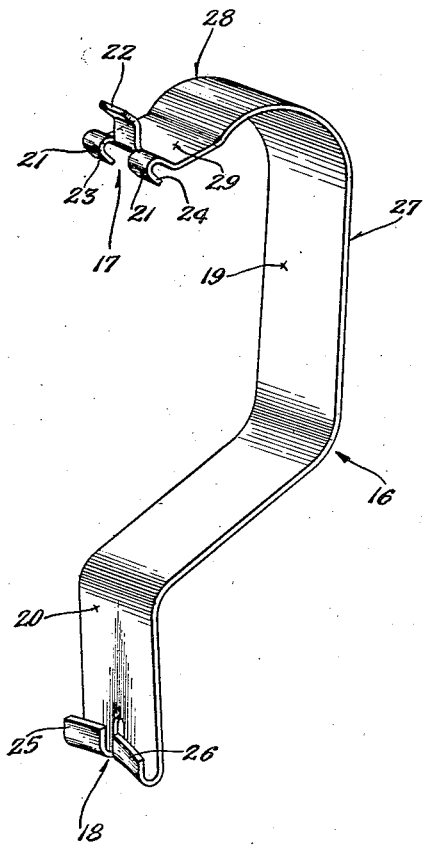
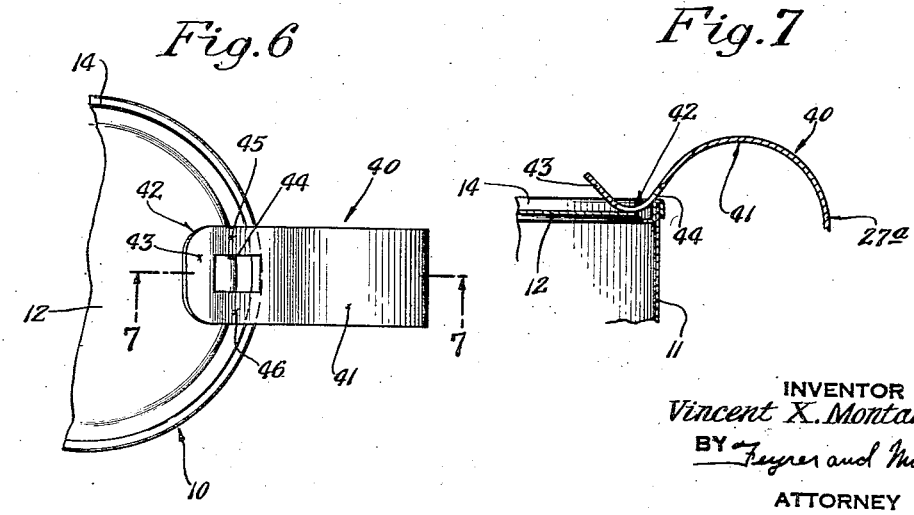
INVENTOR
Vincent X. Montanaro
BY Fryer and Mack
ATTORNEY

United States Patent Office 2,806,732
Patented Sept. 17, 1957

2,806,732

REMOVABLE HANDLES FOR RECEPTACLES

Vincent X. Montanaro, Westport, Conn.

Substitute for abandoned application Serial No. 318,427, February 12, 1940. This application October 1, 1953, Serial No. 383,498

12 Claims. (Cl. 294—33)

This application is a substitute for my abandoned application Serial No. 318,427, filed February 12, 1940.

This invention relates to removable handles for receptacles, especially receptacles such as cups, cans, and the like, having rims or flanges at the upper and lower ends thereof.

At the present time many beverages, and particularly beer, are sold in cans and frequently, especially when used in connection with picnics and the like, persons desire to drink the beverage directly from the can. As the conventional beverage-containing can does not include a handle it is necessary for the user to grasp the can directly in his hand if he is to drink therefrom. If, as is usually the case, the can has been chilled, such direct grasping of the can is extremely uncomfortable to the user.

It, therefore, is an object of the present invention to provide a handle which may be readily applied to and removed from receptacles, such for example as may be used to hold beverages.

There heretofore have been a number of proposals relative to the provision of removable or detachable handles. However, it is an object of the present invention to provide a handle which may be not only more easily attached to and detached from receptacles than those handles heretofore proposed, but which holds the receptacle, when attached thereto, in a particularly firm and positive manner.

It is another object of the invention to provide a removable handle which is simple in construction and which may be very economically produced.

In the attainment of the above and other objects that will hereinafter appear, there is provided as a feature of the invention a removable handle which when associated with a receptacle having a rim, has a positive bias to urge a gripping finger thereof laterally into secure gripping relation with the rim.

Another and related feature of the invention resides in providing a removable handle of resilient construction, which when operatively associated with a receptacle, such for example as a can containing beer, includes a portion intermediate upper and lower gripping fingers that engages an outer side of the receptacle and cooperates in drawing the gripping fingers outwardly into engagement with upper and lower rims.

Another feature of the invention resides in the provision of a novel means for automatically disengaging the handle from the receptacle.

A further feature of the invention resides in so forming one of the pair of rim-gripping fingers that it may be most easily slid and snapped over one of the rims after the other of the gripping fingers has been placed in engagement with the other of the rims.

Other objects, features and advantages will hereinafter appear.

In the drawings:

Figure 1 is a side view showing a handle embodying the present invention, partially associated with a receptacle.

Fig. 2 is a view similar to Fig. 1, but showing the handle completely and operatively associated with the receptacle.

Fig. 3 is a perspective view of the handle shown in Figs. 1 and 2.

Fig. 4 is a top view of a modified form of handle.

Fig. 5 is a sectional view taken on the line 5—5 of Fig. 4.

Fig. 6 is a top view similar to Fig. 4, but showing another modified form of the invention.

Fig. 7 is a sectional view taken on the line 7—7 of Fig. 6.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings, and first to Figs. 1, 2 and 3 there is shown for the purpose of facilitating an understanding of the present invention, a portion of a conventional can 10, commonly used as a receptacle for holding beverages such, for example, as beer, and including a side wall 11, top and bottom walls 12 and 13, and upper and lower rims or flanges 14 and 15.

It is the purpose of the present invention to provide an improved handle 16 which may be readily applied to and detached from a receptacle and which when operatively applied thereto will hold the same in very secure relation. While the handle 16 embodying the present invention is illustrated as associated with a can 10, which may have a hole cut in the top wall 12 thereof to enable drinking of a beverage directly therefrom, it will be readily appreciated that the handle likewise may be associated with other receptacles.

As is conventional with removable handles of the same general class, the handle 16 includes upper and lower fingers 17 and 18 for gripping the upper and lower rims 14 and 15 of the receptacle and an intermediate section 19 by which the handle may be grasped by a user. However, the handle 16 is so constructed that the gripping fingers may be maintained in particularly firm gripping engagement with the rims 14 and 15 of the receptacle.

Thus with a handle embodying the present invention a positive bias is effected when the handle is operatively associated with a receptacle, which not only urges the gripping fingers 17 and 18 toward each other to grip the receptacle as a whole therebetween, but also urges the gripping fingers outwardly into firm engagement with the inner sides of the rims 14 and 15.

In achieving this especially firm and positive gripping action, the handle 16, which advantageously may be formed of a strip of resilient metal, is provided with a section 20, inwardly offset relative to the grasping section 19, and so located with respect to the gripping fingers 17 and 18 that when the lower gripping finger 18 is operatively engaged with the lower rim 15 the upper gripping finger 17, as shown in Fig. 1, is maintained in an outward inoperative position with respect to the upper rim 14 by the engagement of the inwardly offset section 20 with the side wall 11 of the receptacle.

When the upper gripping finger 17 is moved from the outwardly disposed inoperative position, shown in Fig. 1, to the inwardly disposed operative position shown in Fig. 2, therefore, it will be appreciated that the distortion of the handle from its initial position, shown in dotted lines in Fig. 2, will set up an outward spring action tendering to urge the upper gripping finger 17 outwardly against the upper rim. Likewise a spring action is set up serving to laterally draw the lower gripping finger 18 firmly against the lower rim 15.

With the construction above described, and as shown most clearly in Fig. 1, the receptacle is positively and firmly engaged by the handle and three locations longitudinally thereof, with the gripping fingers 17 and 18 engaging and urging outwardly against the upper and lower rims and with the section 20 engaging and urging inwardly against the side wall 11 intermediate the upper and lower rims. These laterally directed gripping actions together with the longitudinally directed gripping actions effected by the reaction set up against the longitudinal distortion of the handle required in moving the upper gripping finger up and over the upper rim 14, thus serve in a most efficient manner to lock the handle relative to the receptacle.

Also, of importance, to facilitate the movement of the upper gripping finger 17 from the initial inoperative position shown in Fig. 1 to the operative position shown in Fig. 2, the gripping finger may be formed with a hook-shaped free end which is inclined downwardly and outwardly to provide a cam surface 21 engageable with the rim and adapted to automatically lift the finger over the rim when the handle is moved inwardly to the completely operative position shown in Fig. 2. An upstanding ear 22, if desired, may be provided for engagement with the thumb of a user to facilitate forcing the upper finger 17 laterally into an operative position and also to serve as a rest or stop for the thumb when the handle is grasped in the usual manner for the purpose of lifting a receptacle associated therewith.

The handle above described may be most simply and economically produced by merely dieing or otherwise cutting a strip, as from a sheet of resilient metal, so as to include at one end portions which may be bent to form laterally spaced hook-shaped sections 23 and 24 providing the upper gripping finger 17 and to form the bent up thumb engaging section 22, and so as to include at the other end portions adapted to be bent to form laterally spaced sections 25 and 26 providing the lower gripping finger 18. After being cut or stamped out in the manner described, it is a simple matter to shape the strip to form a bowed portion 27, terminating at its lower end in the inwardly offset section 20 and the lower gripping finger 18, and at its upper end in an inwardly extending section 28 and the upper gripping finger 17. As shown, and if desired, the bowed portion 19 adjacent the upper gripping finger may be bent slightly downward to provide a section 29 which may cooperate with the hook-shaped free end of the gripping finger in firmly engaging the upper rim. Such a section 29, however, is not necessary for a highly satisfactory operation of the handle.

In the operation of the handle, the lower gripping finger 18 may be hooked over the lower rim 15 with the two sections 25 and 26 thereof engaging the inner side of the rim at circumferentially spaced points for greater lateral rigidity of the handle with respect to the receptacle. Then the upper part of the handle is forced inwardly until the cam surface 21 on the upper gripping finger engages the outer side of the upper rim 14, whereupon further inward pressure causes the cam surface 21 to automatically lift the spaced sections 23 and 24 of the gripping finger over the upper rim. The spring action of the handle then draws the gripping finger 17 and 18 toward each other longitudinally of the handle, draws the gripping fingers outwardly against the inner sides of the rims and draws the inwardly offset section 20 inwardly against the side wall of the receptacle.

To remove the handle, it merely is necessary to lift the upper finger over the upper rim and the handle then automatically springs away from or ejects the receptacle. Alternatively, the handle may be released from the receptacle by pressing downwardly on the inwardly extending section 28, to distort the handle downwardly and thus move the lower gripping finger below the lower rim. The reaction of the inwardly offset section 20 then automatically draws the lower finger outwardly and thus disengages the same from operative relation with the receptacle.

To facilitate removal of the handle, and as shown in Figs. 4 and 5, there may be associated therewith a lifting member 30 adapted to engage the upper rim and lift the hook-shaped free end of the gripping finger thereover. As shown, this lifting or disengaging member 30 advantageously may comprise a pivotally mounted lever 31 having an inwardly extending section 32 terminating in a lifting cam 33 adapted to engage the upper rim 14, and an outwardly extending section 34 terminating in a finger portion 35 adapted to be readily engaged by a thumb of a user holding the handle in a usual manner.

For thus pivotally mounting the lever 31 there is provided by the present invention a particularly simple and sturdy construction, including an intermediate ear 36 which extends downwardly through a closed ended slot 37 in the inwardly extending section 28 of the bowed portion and through which is projected a pin 38. A slot 39, also formed in the inwardly extending section but spaced inwardly of the slot 38, provides an opening for receiving the rim-engaging cam 33.

With the foregoing construction, it will be readily appreciated, upward pressure on the finger portion 35 causes the cam 33 to move in a direction to lift the hook-shaped free end of the gripping finger 17 upwardly, and the spring action of the handle automatically draws the gripping finger outwardly relative to the upper rim to eject the receptacle from operative engagement by the handle.

If desired, and as shown in Figs. 6 and 7, there may be utilized a modified construction involving a modified handle 40 identical in operation and construction with the one shown in Figs. 1, 2 and 3 except in the inclusion of an inwardly extending section 41 on the bowed portion 27a which is so shaped that it provides no portion adapted to engage the outer side of the upper rim 14 when the handle is operatively associated therewith but is formed merely with a modified gripping finger 42 which is adapted to engage the top wall of the receptacle and the inner side of the rim. This modified gripping finger 42, unlike the gripping finger 17 shown in Figs. 1, 2 and 3, is not formed with a downwardly and outwardly inclined free end, but, on the contrary terminates in a portion 43 which extends upwardly and inwardly. The portion 43, however, like the downwardly and outwardly inclined free end of the gripping finger 17, does provide a cam surface for automatically lifting the modified finger 42 over the upper rim when the upper end of the handle is moved from an outer inoperative to an inner operative position with respect to the receptacle.

Also, preferably and as shown, the strip from which the modified handle 40 is formed, is slotted at 44 to provide spaced sections 45 and 46 in the gripping finger 42, which, like the spaced sections 23 and 24 in the finger 17 shown in Figs. 1, 2 and 3, by engaging the rim 14 at points spaced circumferentially thereof, thereby serve to more firmly maintain the handle against transverse shifting or turning relative to the receptacle when operatively associated therewith.

Variations and modifications may be made within the scope of this invention and portions of the improvements may be used without others.

Having thus described the invention, what is claimed as new is:

1. A removable handle for association with a receptacle having upper and lower rims, including upper and lower rim-gripping means yieldingly expansible relative to each other and adapted to operatively engage said rims, at least one of said gripping means having a hook-shaped free end inclined downwardly and outwardly to facilitate a sliding of the latter over a rim when being moved inwardly into operative relation therewith; means engageable with an outer side of said receptacle, intermediate said gripping means; and resilient means, cooperable with said last-named means for urging said hook-shaped free end outwardly into gripping engagement with a rim when the handle is operatively associated with said receptacle.

2. A removable handle for attachment to a receptacle of the type having upper and lower rims projecting respectively upward and downward from the receptacle, comprising an elongate member capable of being flexed longitudinally, said member adjacent one end having means engageable with the inner side of the lower rim of the receptacle and having adjacent its other end means engageable with the inner side of the upper rim of the receptacle, said member further having means intermediate its ends provided with an abutting surface engageable with a side of the receptacle at a point between the top and bottom thereof, said means at the ends of the member and the means intermediate the ends being normally out of alignment and being brought substantially into alignment and maintained under continual pressure laterally of the receptacle by flexure and attachment of the member to the receptacle.

3. The invention as defined in claim 2 in which the member comprises a metal strip, and in which the means adjacent the ends of the member comprise end portions of the strip which are doubled-back to embrace the said rims.

4. The invention as defined in claim 2 in which the member is so constituted and arranged that the means adjacent the ends of the member are disposed further from each other when the member is under flexure and attached to the receptacle.

5. A removable handle for attachment to a receptacle of the type having upper and lower rims projecting respectively upward and downward from the receptacle, comprising an upper gripping means having a rim-engaging portion; a lower gripping means having a rim-engaging portion; a main handle section disposed intermediate said gripping means; means carried by said main handle section, providing an abutting surface for engaging an outer side of the receptacle intermediate the upper and lower rims when the handle is attached thereto; and resilient means, connected with said abutting surface, for drawing said rim-engaging portions of the gripping means laterally outward of the receptacle into gripping engagement with the rims thereof when the handle is attached to the receptacle with the abutting surface engaging the side of the receptacle.

6. The invention as defined in claim 5 in which the resilient means normally holds the abutting surface and both the gripping means out of alignment when the handle is detached from the receptacle, said surface and gripping means being substantially aligned and the resilient means placed under tension when the handle is attached to the receptacle.

7. The invention as defined in claim 2 in which the means provided with the abutting surface comprises an inwardly offset portion of the member.

8. The combination with a cylindrical can having a closure at each end and an endwise projecting rib at the peripheral portion of each such closure, of a removable handle in connection with such can, said handle comprising a length of elastic springy strap material of formation including a hand grip of length less than the axial length of the can and terminating at one end in an inwardly extending hook clip in engagement with the inner surface of the can rib at one end of the can, a reach in connection with the other end of the hand grip and extending to the other end of the can and terminating in a second inwardly extending hook clip in engagement with the inner surface of the can rib at said other end of the can, the point of connection of the hand grip and said reach comprising a fulcrum element in engagement with the cylindrical surface of the can, and said reach also being of formation lying outwardly from the cylindrical surface of the can at all points between the second hook clip and the said fulcrum element the length of elastic spring strap material being normally biased of formation such that the fulcrum element normally lies at the side of a straight line extending between the two hook clips opposite to the location of the hand grip.

9. A device as specified in the above cliam, wherein said length of springy material is normally biased to cause the hook clips to assume positions spaced apart from each other a distance less than the distance between the ribs at the two ends of the can.

10. As a new article of manufacture, a handle element for spring application to a can, which can is provided with endwise outwardly projecting ribs at its two ends, said handle comprising a length of elastic springy strap material of formation including a hand grip of length less than the length of the handle element and terminating at one end in an inwardly extending hook clip adapted to engage the inner face of one of the can ribs and to include a reach in connection with the other end of the hand grip and extending away from the aforesaid hook clip and terminating to a second hook clip adapted to engage the inner face of the other can rib, both of said hook clips facing each other, and said reach being of formation to provide a fulcrum element at a point adjacent to the hand grip and between the hand grip and said second hook clip, and the reach being normally biased of formation such that all portions of the reach other than said fulcrum element lie at the same side of a straight line extending between the two hook clips as the hand grip and such that the fulcrum element lies at the opposite side of said straight line.

11. As a new article of manufacture, a device as specified in the above claim, wherein said handle element is also normally spring biased such that the distance between the two hook clips is less than the distance between the outwardly projecting ribs at the two ends of a can to which the handle element is applied.

12. A removable handle for attachment to a receptacle of the type having a rim projecting from one end, comprising an elongate main handle section having rim-gripping means adjacent one end, engageable with the inner side of the rim of the receptacle; means adjacent the other end of the handle section, for engagement with the other end of the receptacle, said means preventing outward lateral movement of said other handle and with respect to the receptacle when the handle is attached thereto; means carried on and disposed intermediate the ends of the main handle section, engageable with a side of the receptacle for applying continuous force thereto when the handle is attached to the receptacle whereby the rim-gripping means is forcibly held in engagement with the inside surface of the rim; and in which there is means including a manually operable member movably mounted adjacent the end of the main handle section and engageable with the receptacle, for forcing said rim-engaging means away from and out of engagement with the rim of the receptacle.

References Cited in the file of this patent

UNITED STATES PATENTS

| 779,297 | Love et al. | Jan. 3, 1905 |
| 894,725 | Cooper | July 28, 1908 |
| 1,505,369 | Brown | Aug. 19, 1924 |
| 2,128,466 | Machotka | Aug. 30, 1938 |
| 2,288,359 | Jenkins | June 30, 1942 |

FOREIGN PATENTS

| 2,793 | Great Britain | Feb. 5, 1909 |